(12) United States Patent
Gu

(10) Patent No.: US 7,588,257 B2
(45) Date of Patent: Sep. 15, 2009

(54) TRAMMER

(75) Inventor: Xinjun Gu, Ningbo (CN)

(73) Assignee: Ningbo Hualei Tool Co., Ltd, Ningbo (CN)

( * ) Notice: Subject to any disclaimer, the term of this patent is extended or adjusted under 35 U.S.C. 154(b) by 60 days.

(21) Appl. No.: 11/905,937

(22) Filed: Oct. 5, 2007

(65) Prior Publication Data

US 2008/0303231 A1 Dec. 11, 2008

(30) Foreign Application Priority Data

Jun. 6, 2007 (CN) .................... 2007 1 0069064

(51) Int. Cl.
*B62B 1/00* (2006.01)
(52) U.S. Cl. ................. 280/79.11; 280/32.6; 280/47.11; 280/47.131; 280/47.34; 280/62; 280/80.1; 280/87.01 B
(58) Field of Classification Search .............. 280/79.11, 280/32.6, 47.11, 47.131, 47.34, 62, 80.1, 280/87.01
See application file for complete search history.

(56) References Cited

U.S. PATENT DOCUMENTS

| 4,917,401 A * | 4/1990 | Iwaki .......................... 280/655 |
| 5,590,897 A * | 1/1997 | Tsai ............................ 280/655 |
| 6,024,376 A * | 2/2000 | Golichowski et al. ..... 280/655.1 |
| 6,783,147 B1 * | 8/2004 | Green, Sr. .................... 280/652 |
| 6,877,764 B2 * | 4/2005 | Sagol ....................... 280/655.1 |
| D566,925 S * | 4/2008 | Wu ............................. D34/17 |
| D570,068 S * | 5/2008 | Dukes ......................... D34/17 |

* cited by examiner

*Primary Examiner*—Jeffrey Restifo
*Assistant Examiner*—Cynthia F. Collado
(74) *Attorney, Agent, or Firm*—Birch, Stewart, Kolasch & Birch, LLP

(57) ABSTRACT

There is provided a trammer in the present invention, comprising a panel and a handspike, with the handspike slots corresponding to the handspike located on both sides of the panel and the locating device connected with the handspike also located on the panel. The locating device comprises the locating hole at the inside bottom of the handspike, the elastic fastener corresponding to the locating hole and the handspike connector. In the present invention, the position of the handspike can be selected according to the demand of users. When the handspike need to be used, the handspike can be turned out, and the handspike and the carrying panel are localized at a certain angle via locating device for operations; when the handspike need not to be used, the handspike can be embedded in the panel to effectively decrease the space volume of the trammer and be advantageous to overlap and stack up the carrying panel of the trammer. At the same time, the effective carrying area of the trammer is increased so that the trammer can furthest steadily carry goods to the larger extent. It is simple and practical that the conversion of the handcart and the flat trammer can be accomplished by the turn of the handspike.

8 Claims, 4 Drawing Sheets

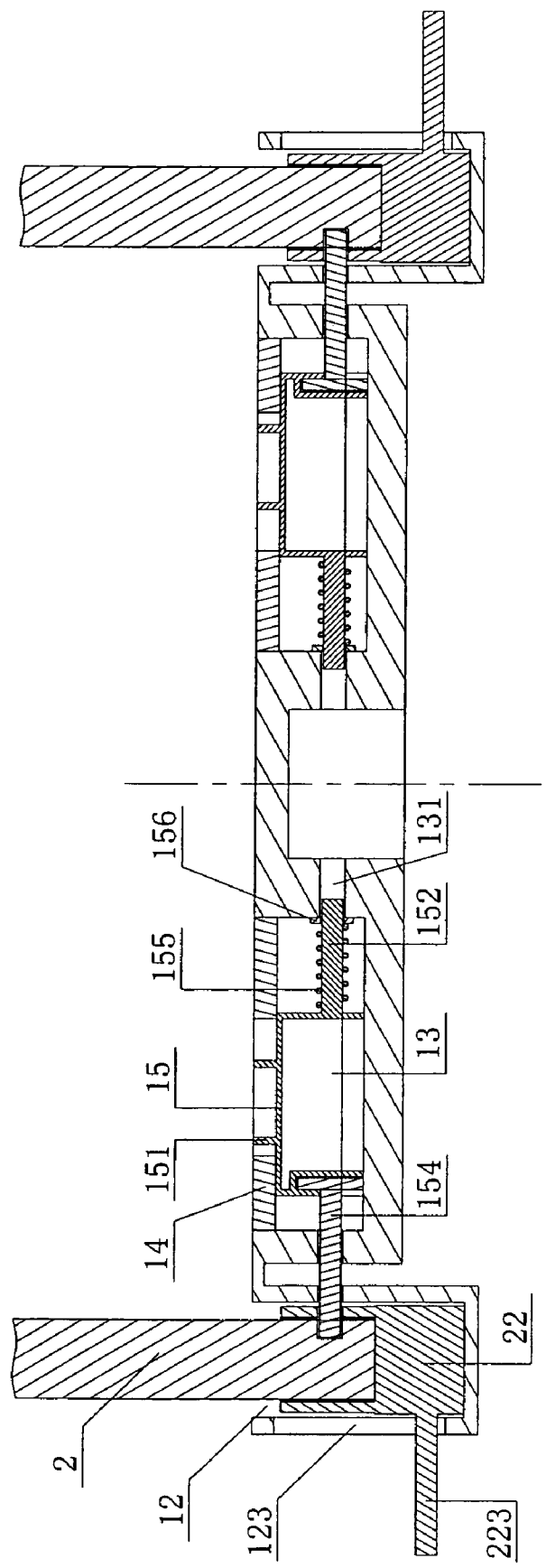

TRAMMER

TECHNICAL FIELD

The present invention relates to a trammer, more particularly to the connecting device between a handspike and a panel of the trammer.

BACKGROUND ART

At present, the handspike of the general carrying trammer and the carrying panel typically have a fixed connection, or a handspike disassembled connection. Thus, there is a shortcoming when there is a need to store multiple trammers in a storage space of limited sized. In other words, because of the handspike is fixed above the panel, when trammers are collectively stacked, the panels of the trammers cannot be completely overlapped due to the effect of the handspike. The trammer only can be laid on the ground so that the space needed for storage is large. For a disassembled connection of handspike, when trammers are collectively stacked, the handspikes need to be taken down, and then kept in another place. When the trammer needs to be used, the handspike needs to be reconnected to the panel. The process is relatively complex. In May 16, 2007, China's State Intellectual Property Bureau opened a utility model patent about a handcart, namely Chinese Publication No. CN2900281. Publication No. CN2900281 disclosed an improvement to the traditional handcart which included a superimposed folder between the push handgrips and the carriage, and which enables the push handgrips to rotate from the horizontal position to basically a vertical position, consequently the space of the handcart is decreased, and is conveniently stored. But it is not designed to fully improve the carriage. Although the superimposed folder device decreases the space required for stacking the trammers to the certain extent, the trammers cannot be very effectively stored. In the case where the panels of the trammers fully overlapped when stacked, because of the fixed position of the carriage in this invention, the demand of overlapping stacking panel cannot be satisfied. Meanwhile, the fixed carriage causes the carrying area of the handcart panel to be restricted, and a part of the goods must be placed outside of the panel, in the situation when the area of the carried goods is larger than that of the panel. Due to the asymmetrical stress on the panel front and back, the center of gravity of handcart shifts forward making it easy for the goods to drop off. Therefore, in many needs, the handcart of Publication No. CN 2900281 the carrying area is not large enough.

DISCLOSURE OF INVENTION

The technical problem solved in the present invention is to provide a trammer, which can effectively solve the problem of collectively stacking the trammers, especially the problems of overlap stacking of the panels, and decreasing the storage space required of the stacked trammers. At the same time, the trammer of the present invention can steadily carry the goods with large area to the largest extent, and solve the problem of the area limitation caused by the existence of the handspike without incline when the goods put on the panel and without dropping-off owing to the instable center of the gravity during the portage.

To solve above technical problems, the present invention uses the following technical solution: a trammer comprising a panel and a handspike, wherein the handspike slots are located on both sides of the said panel corresponding to the handspike and a locating device connected with the handspike is also located on the said panel.

Further, the locating device comprises a locating hole at the inside bottom of the handspike, an elastic fastener corresponding to the locating hole and a handspike connector.

Preferably, the said elastic fastener comprises a slipper slot in and on which a slipper and a slot cover are located respectively. On one and the other side of the slipper an elastic piece and a location piece are located. The handspike connector comprises a locating slot and a handspike cover inside the locating slot in which a slip unit is located to make the said handspike cover slip up and down. The location piece is engaged with the location hole via the said slipper slot and locating slot.

Preferably, the elastic piece comprises an extension rod on one side of the slipper and a spring on the extension rod, a through hole IV located on the slipper slot through which the slipper slips around in the slipper slot via the said extension rod.

Preferably, the elastic piece comprises an extension rod on one side of the slipper and a spring on the extension rod. The length of the extension rod is shorter than that of the spring through which the slipper slips around in the slipper slot.

Preferably, the said location piece comprises a U-shaped slot on one side of the slipper and a locating pin embedded in the U-shaped slot, through holes V and II located on the slipper slot and the locating slot, the locating pin engaging with the location hole through the trough holes V and II.

Preferably, the slip set includes a counterbore located inside the locating slot and a sliding slot located on one side of the counterbore, a sliding rod located on the handspike cover via which the handspike slipcover traverses the sliding slot and slips up and down in the counterbore.

Preferably, the cover fastener and through hole III are located on one side of the slot and a projection block on the other side. The screw, slots II and III are located on the slipper slot. The slot cover restricts the slipper on the said slipper slot by the engagements of the cover fastener with the slot II, with the projection block and the slot III, and also with the through hole III and the screw.

Further, a slipper forced device, which is a circular ring fastener, is also located on the slipper. A guiding slot corresponding to the slipper forced device is open on the slot cover. The slipper can slip by the force on the circular ring fastener so that the locating pin can disengage from the location hole on the handspike.

Further, protrusions are located on the panel to increase the friction force of the panel surface.

The above technical solutions are used in the present invention to achieve the location of the handspike, so the trammer can select the position of the handspike according to the demand of users. When the handspike needs to be used, the handspike can be turned out, the handspike and the carrying panel being localized at a certain angle via the locating device for operations. When the handspike does not need to be used, the handspike can be embedded in the panel to effectively decrease the space volume of the trammer, and to be advantageous in the carrying panel of the trammer when the multiple trammers are stacked. At the same time, after the handspike is embedded in the panel, the handcart can be converted to flat trammer and the smooth panel surface will not make the goods incline, and the effective carrying area of the panel is increased. While carried goods with an area slightly larger than the panel, the goods can be placed in the center of the panel and the goods are not dropped off due as the result of the center of gravity of trammer having shifted forward. Thus, the trammer can steadily carry goods with large bulk. Also, depending the different goods to be carried by the trammer, the handspike can be turned by a simple and practical operation so that the trammer is arranged according to the demands the of the situation.

DESCRIPTION OF THE DRAWINGS

The present invention will be further described with conjugation to the drawings.

FIG. 9 is an A-A schematic cross-sectional view of FIG. 1.

EMBODIMENT MODE FOR CARRYING OUT

Figure 1:
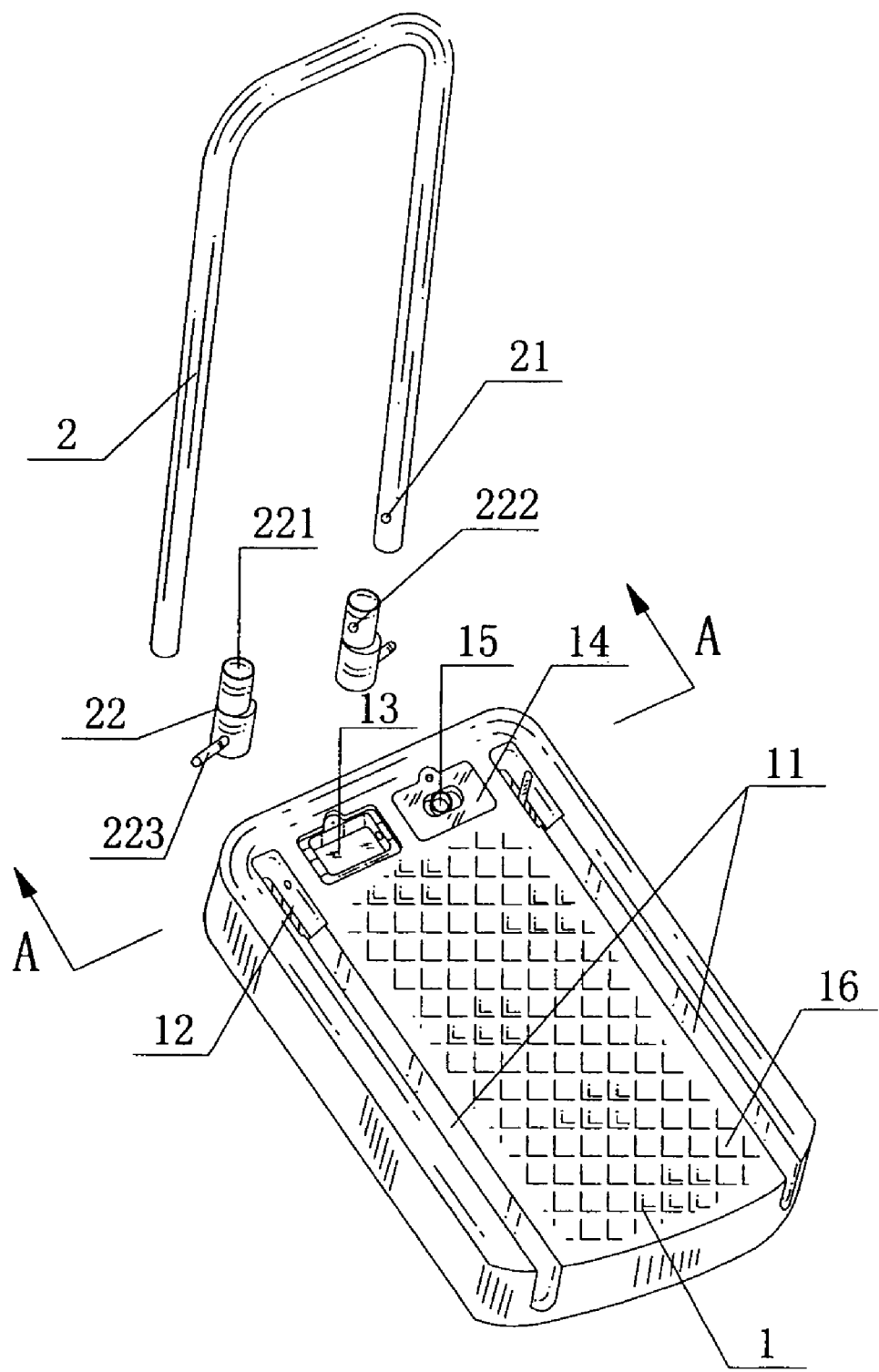
FIG. 1 is a whole structural schematic illustration according to the present invention.
Figure 8:
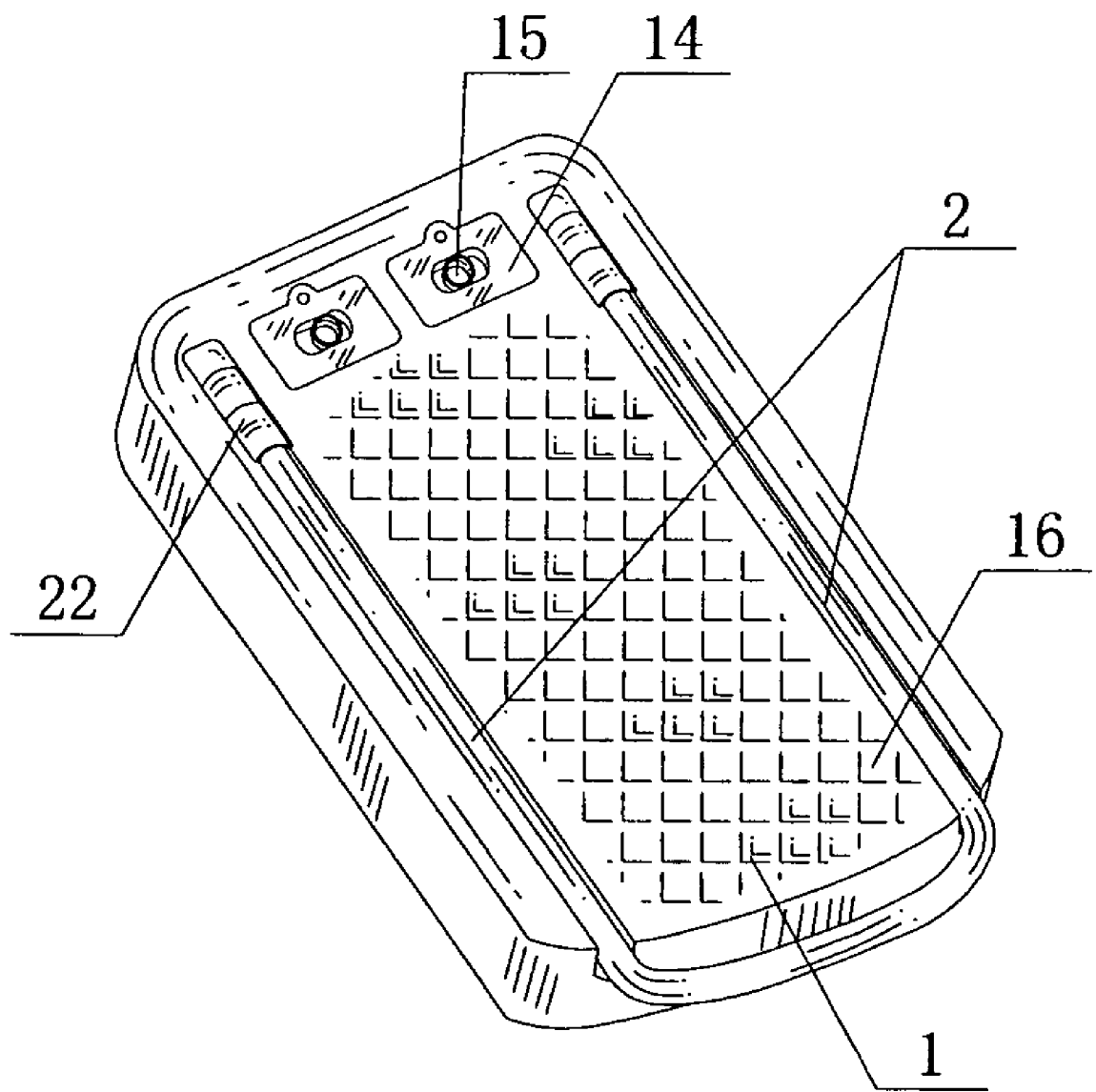
FIG. 8 is a structural schematic illustration for the embedded state of the handspike according to the present invention.

FIG. 1, FIG. 8 and FIG. 9 are embodiments of a trammer according to the present invention. The trammer comprises a panel 1 and a handspike 2, a handspike slot 11 corresponding to the handspike 2 located on both sides of the panel 1, a locating device connected with the handspike 2 also located on the panel 1. The locating device comprises a location hole 21 at the inside bottom of the handspike 2, an elastic fastener corresponding to the location hole 21 and connector.

Figure 2:
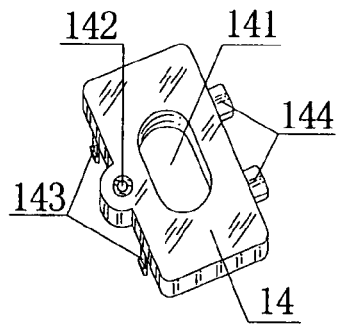
FIG. 2 is a schematic illustration of the slot cover according to the present invention.
Figure 3:
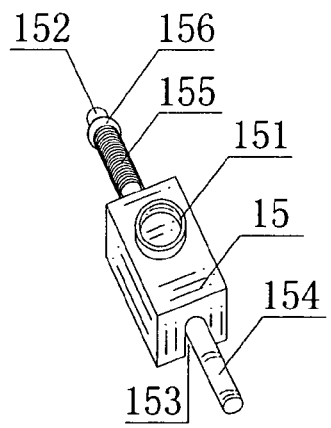
FIG. 3 is a schematic illustration of the slipper according to the present invention.
Figure 7:
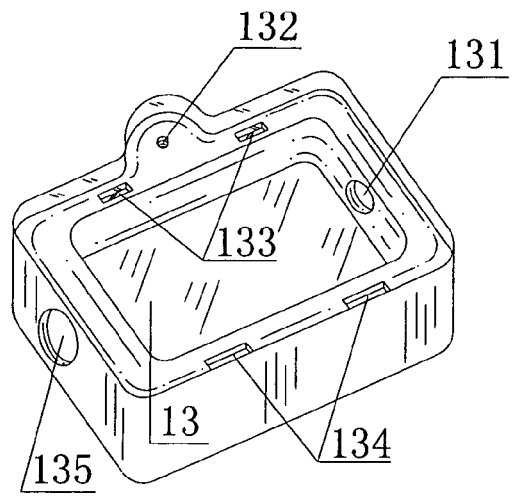
FIG. 7 is a schematic illustration of the slipper slot according to the present invention.

FIG. 2, FIG. 3, and FIG. 7 show the elastic fastener of the present embodiment, which comprises a slipper slot 13, a slipper 15 and a slot cover 14 located in and on the said slipper slot 13, respectively, an elastic piece located on one side of the slipper 15 which is: an extension rod 152 with a spring 155 and a shim 156 located on one side of the slipper 15, a through hole 131 also located on one side of the slipper slot 13, the extension rod 152 through the through-hole IV 131, the spring 155 being inside the slipper slot 13 and being telescopic due to the effect of the shim 156.

Another embodiment for this elastic piece includes: an extension rod 152 with a spring 155 located on one side of the slipper 15, the length of the extension rod 152 shorter than that of the spring 155, the extension rod 152 only playing a role in limiting the position of the spring 155 which is inside the slipper slot 13 and could be telescopic. A location piece is located on one side of the slipper 15, which is a U-shaped slot 153 located on the other side of the slipper 15 with a locating pin 154 embedded on the U-shaped slot 153 and a through-hole V 135 located on the other side of the slipper slot 13 and with the locating pin 154 going through the through-hole V 135. The circular ring fastener 151 is located on the top of the slipper 15, which is the forced position on the slipper 15 slipping. The guiding slot I 141 corresponding to forced device of the slipper 15 is open on the slot cover 14. The slipper can slip by forcing on the circular ring fastener 151 so that the locating pin 154 can disengage from the location hole 21 on the handspike 2. The screw hole 132, slots II 133 and III 134 are located on the slipper slot 13, the cover fastener 143 and through-hole III 142 can be located on one side of the slot cover 14 and the projection block 144 can be located on the other side. The engagements of the cover fastener 143 with the slot II 133 and that of the projection block 144 with the slot III 134 can make the slot cover 14 cover the slipper slot 13. The through-hole III 142 corresponds to the screw 132 and make the slot cover 14 fix on the panel 1 via bolts and limit the slipper 15 inside the slipper slot 13.

Figure 4:
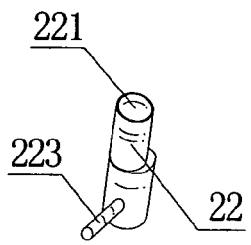
FIG. 4 is a schematic illustration of the handspike cover according to the present invention.
Figure 5:
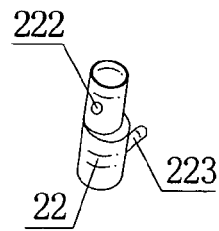
FIG. 5 is a schematic illustration of the other symmetrical handspike cover according to the present invention.
Figure 6:
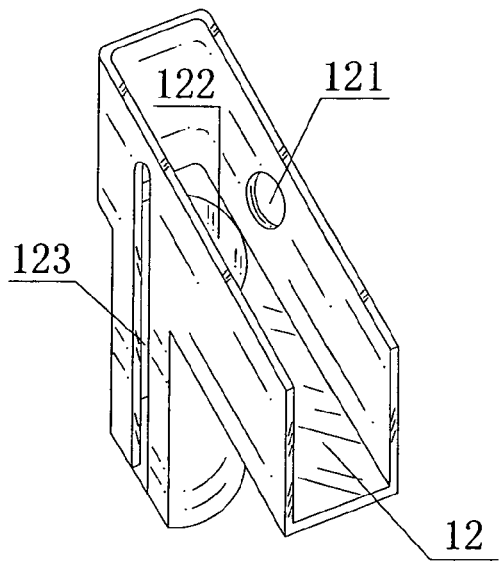
FIG. 6 is a schematic illustration of the locating slot according to the present invention.

FIG. 4, FIG. 5, and FIG. 6 show the handspike connector of the present embodiment. The handspike connector includes the locating slot 12 and the handspike cover 22 located inside the locating slot 12; through-hole I 222 corresponding to the location hole 21 and sliding bars 223 are located inside and outside of the handspike cover 22, respectively. The handspike 2 can enter the handspike cover through the cover-entrance of the cove 221 and be fixed with the handspike, cover 22. The locating slot 12 is provided with a counterbore 122 with a sliding slot 123 located outside. The handspike cover 22 is located inside the counterbore 122 and the sliding rod 223 traverses the sliding slot 123. Therefore, the handspike cover 22 can slip up and down inside the counterbore 122 due to the effect of the sliding slot 123, and can be limited inside the counterbore 122.

The through-hole II 121 is also located inside the locating slot 12 with a locating pin 154 entering the through-hole I 222 through the through-holes V 135 and 121 so as to be engaged with the location hole 21 for positioning. Protrusions 12 are provided on the panel 1 to increase the friction force of the panel surface when the goods are carried.

When the handspike cover 22 in FIG. 4 sliding downwards to make the locating pin 154 and through-hole I 22 inside the handspike cover 22 just overlap, the locating pin 154 is engaged with the locating hole 21 on the handspike through the through-hole I 222 due to the effect of the spring 155. The positioning of the handspike 2 is achieved and the handspike 2 and carrying panel 1 are localized at a certain angle for operations. When the handspike does not need to be used, the spring 155 is compressed by manually forcing on the circular ring fastener to make the locating pin 154 disengage from the location hole 21 and at the same time make the handspike 22 lift upward, i.e. when the sliding bar 223 outside the handspike 22 glids up to the top in the sliding slot 123, the handspike 2 is embedded in the handspike slot 11 on the shipment panel 1 by turning the handspike 2.

The invention claimed is:

1. A trammer comprising:
   a panel (1),
   a handspike (2),
   a handspike slot (11) corresponding to the handspike (2), the handspike being located on both lateral sides of the panel (1),
   a locating device connected with the handspike (2) and located on the panel (1), the locating device including a location hole (21) at the inside bottom of the handspike (2),
   an elastic fastener corresponding to the location hole (21), the elastic fastener including a slipper slot (13), a slipper (15) provided in the slipper slot, and a slot cover (14) provided over the slipper slot,
   an elastic piece is provided on one lateral side of the slipper (15),
   a location piece is located on an opposite lateral side of the slipper (15),
   a handspike connector including a locating slot (12), and a handspike cover (22) and a slip unit disposed inside the locating slot (12), wherein the slip unit is adapted to make the handspike cover (22) slip up and down, and the location piece is engaged with the location hole (21) via the slipper slot (13) and locating slot (12).

2. The trammer according to claim 1, wherein the elastic piece comprises a extension rod (152) on one side of the slipper (15) and a spring (155) on the extension rod (152);

wherein a through hole IV (131) is also located on the sipper slot (13) through which the slipper (15) slips around in the slipper slot (13) via the extension rod (152).

3. The trammer according to claim 1, wherein the elastic piece comprises an extension rod (152) on one side of the slipper (15) and a spring (155) on the extension rod (152), wherein a length of the extension rod (152) is shorter than that of the spring (155) through which the slipper (15) slips around in the slipper slot (13).

4. The trammer according to claim 1, wherein the location piece comprises a U-shaped slot (153) on one side of the slipper (15) and a locating pin (154) embedded in the U-shaped slot (153), through holes V (135) and II (121) are respectively located on the slipper slot (13), and the locating slot (12) through which the locating pin (154) is engaged with the location hole (21).

5. The trammer according to claim 1, wherein the slip unit comprises a counterbore (122) located inside the locating slot (12) and a sliding slot (123) located on one side of the counterbore (122), and a sliding rod (223) is located on the handspike cover (22) through which the handspike cover (22) traverses the sliding slot (123) and slips up and down in the counterbore (122).

6. The trammer according to claim 1, wherein a cover fastener (143) and a through hole III (142) are located on one side of the slot cover (14) with a projection block (144) being located on the other side, wherein screw hole (132), slots II (133) and III (134) are located on the slipper slot (13), and the slot cover (14) restricts the slipper (15) on the slipper slot (13) by the engagement of the cover fastener (143) with the slot II (133), with the projection block (144) and the said slot III (134), also with the through hole III (142) and the screw hole (132).

7. The trammer according to claim 1, wherein a slipper forced unit, which is a circular ring fastener (151), is also located on the slipper (15), and a guiding slot I (141) corresponding to the slipper forced unit is open on the slot cover (14).

8. The trammer according to claim 1, wherein protrusions (16) are provided on the panel (1).

* * * * *